No. 876,215. PATENTED JAN. 7, 1908.
N. E. MORRIS, Jr.
CASH REGISTER AND INDICATOR.
APPLICATION FILED MAY 13, 1903.
8 SHEETS—SHEET 2.
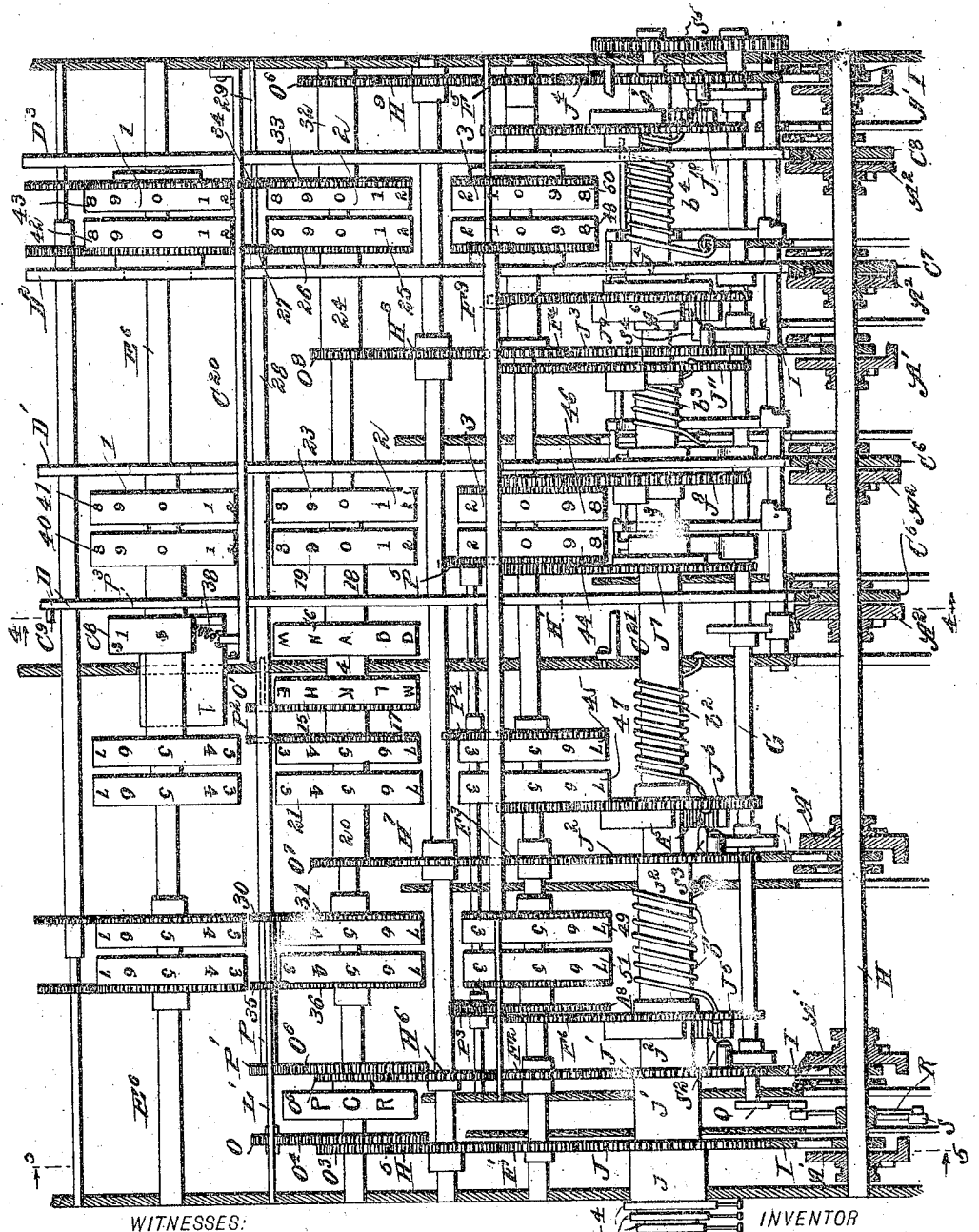

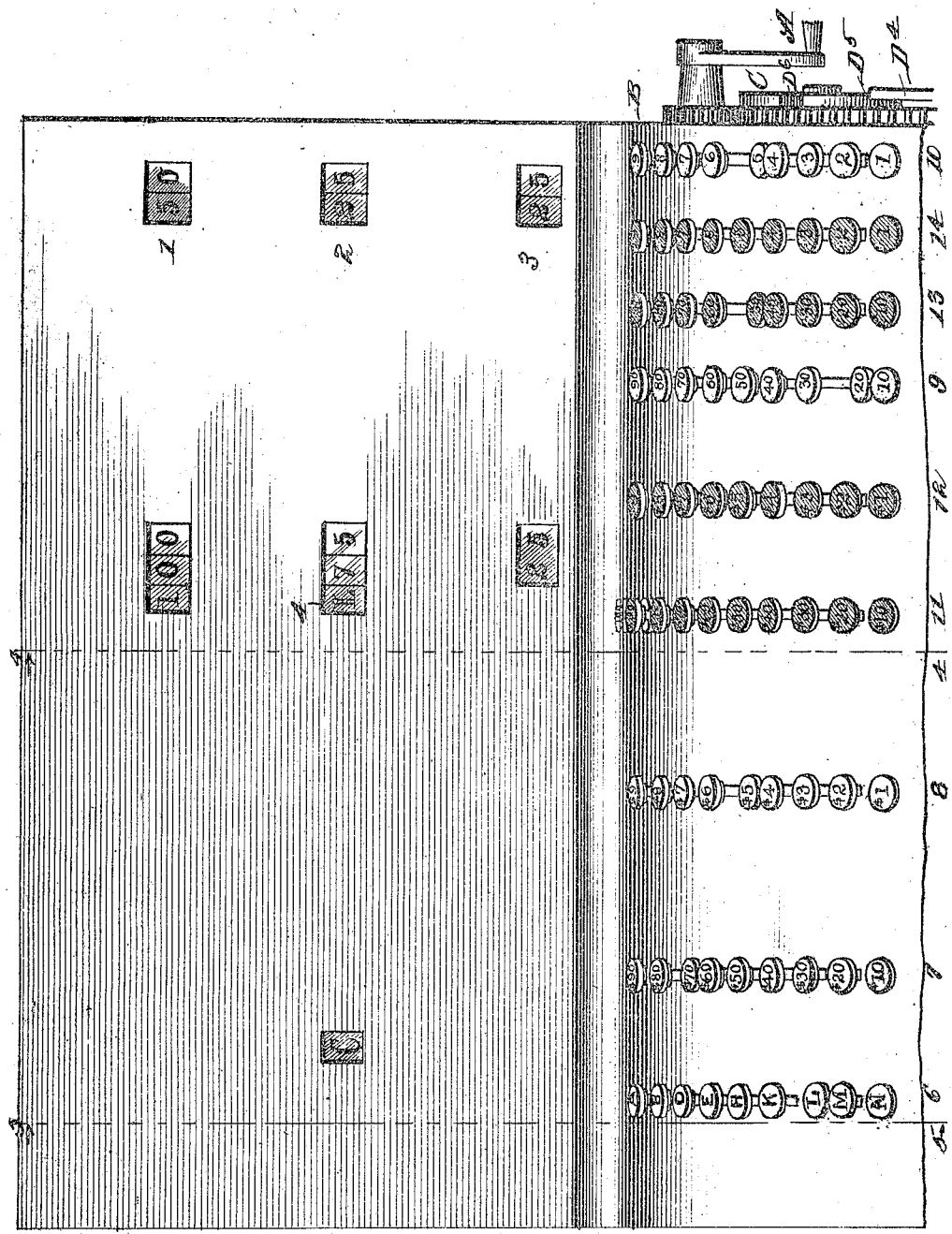

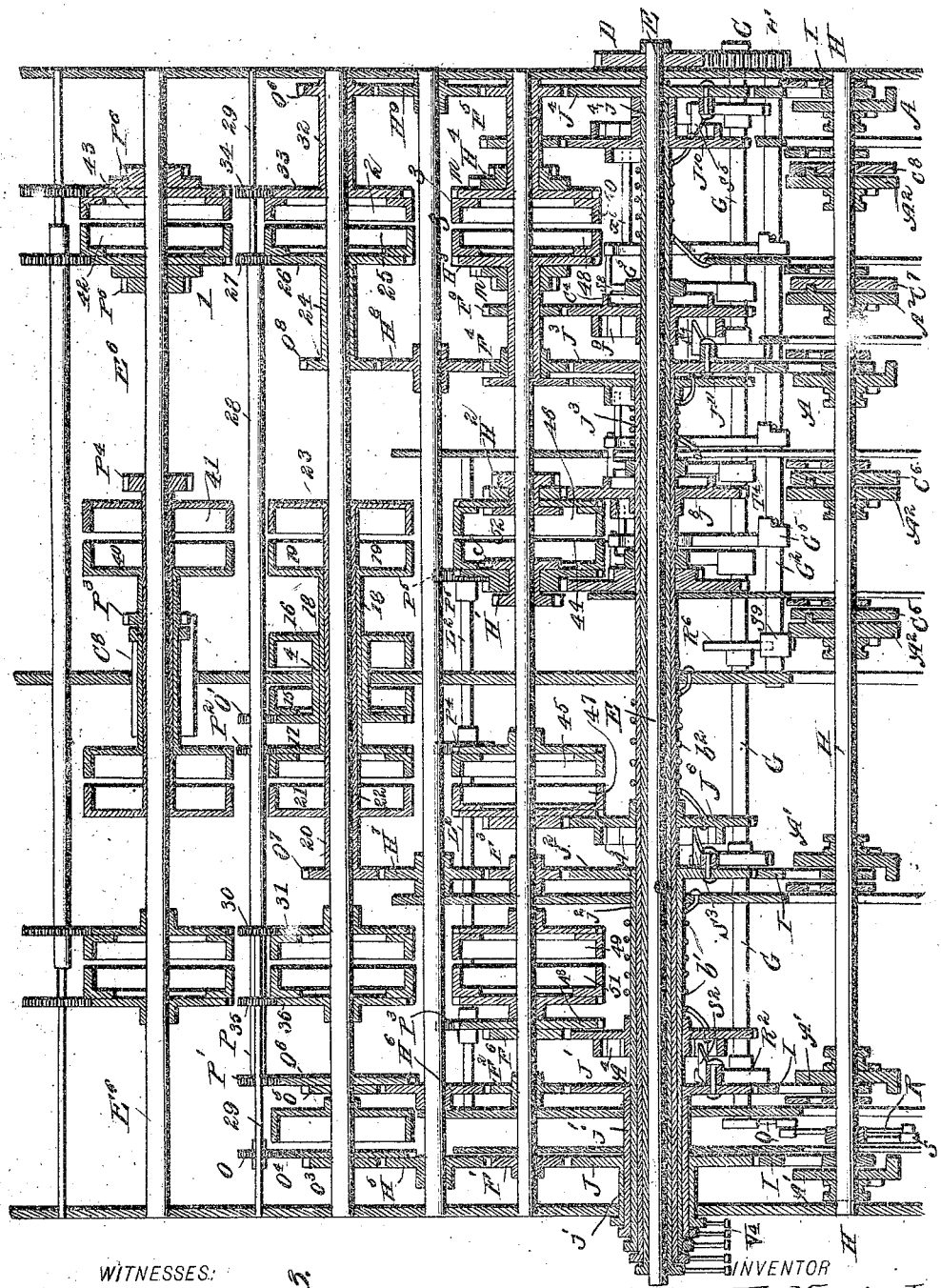

No. 876,215. PATENTED JAN. 7, 1908.
N. E. MORRIS, Jr.
CASH REGISTER AND INDICATOR.
APPLICATION FILED MAY 13, 1903.
8 SHEETS—SHEET 4.
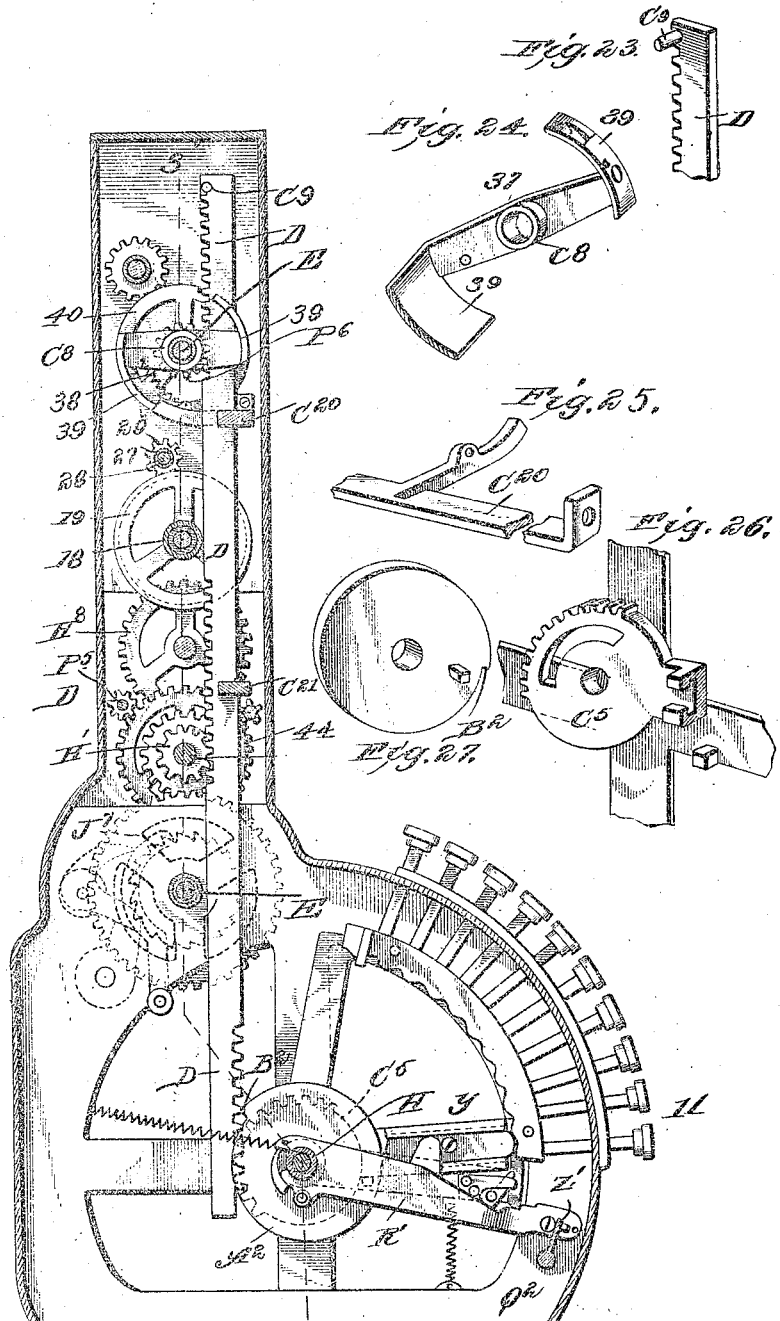
WITNESSES:
INVENTOR
ATTORNEYS.

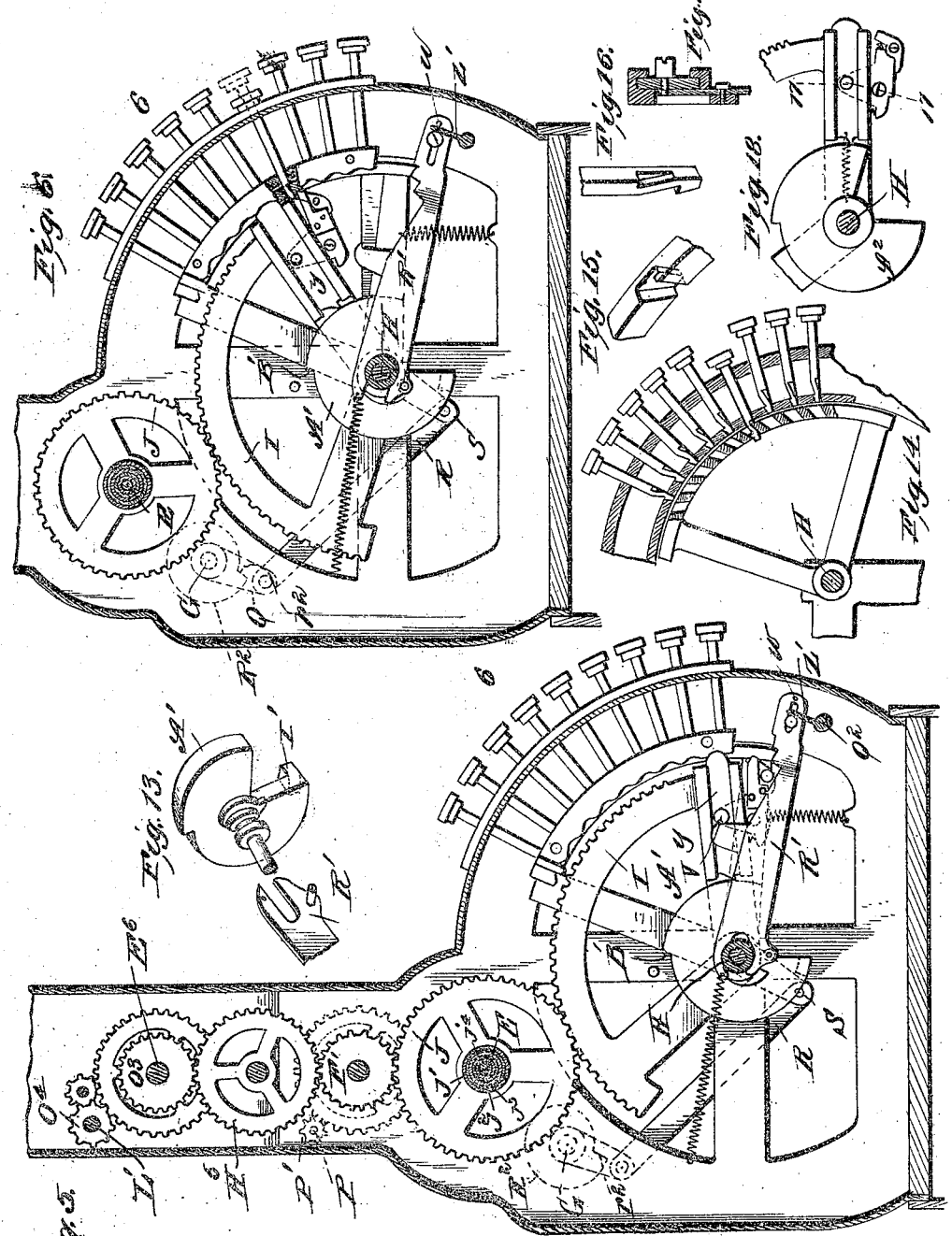

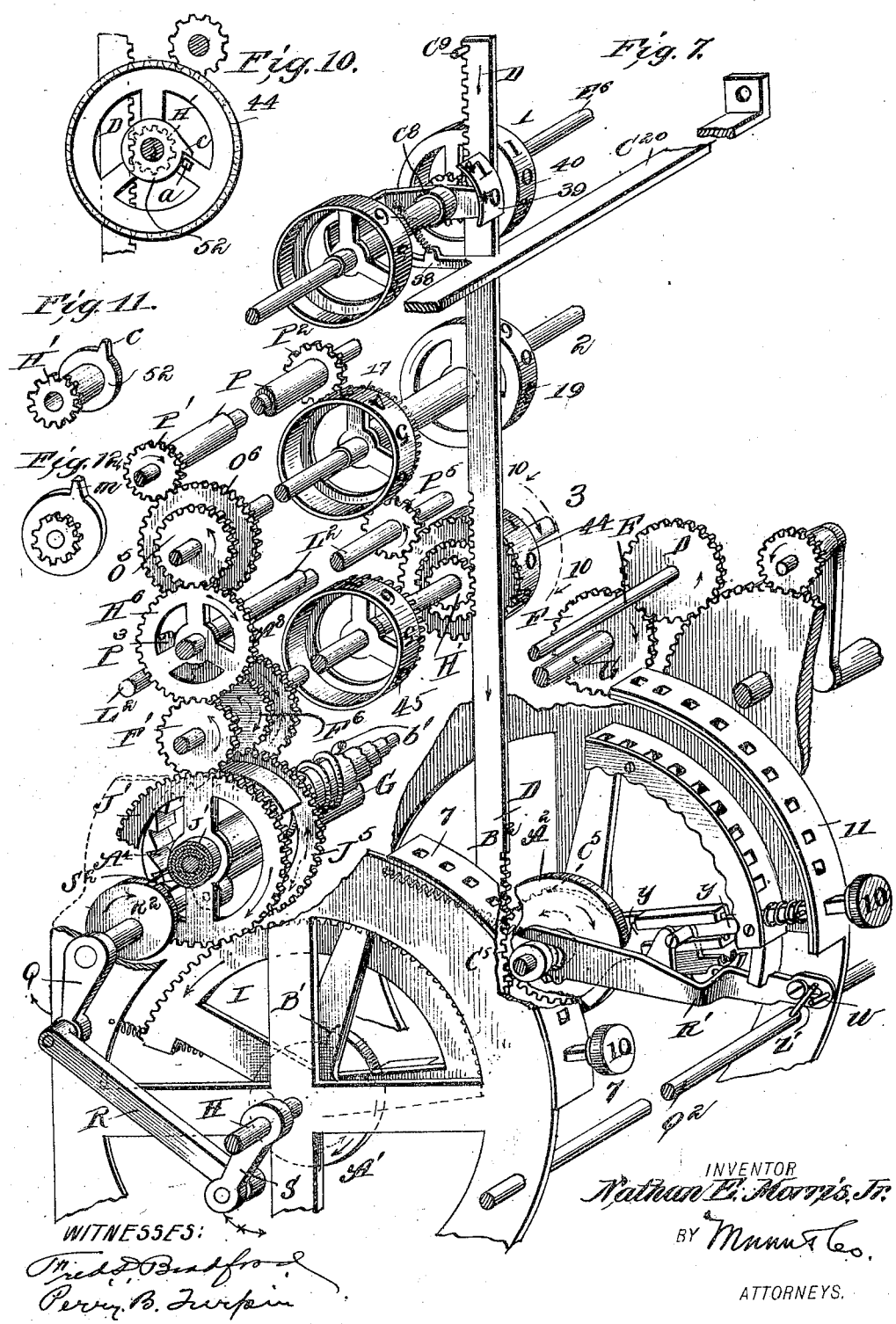

No. 876,215. PATENTED JAN. 7, 1908.
N. E. MORRIS, Jr.
CASH REGISTER AND INDICATOR.
APPLICATION FILED MAY 13, 1903.
8 SHEETS—SHEET 7.
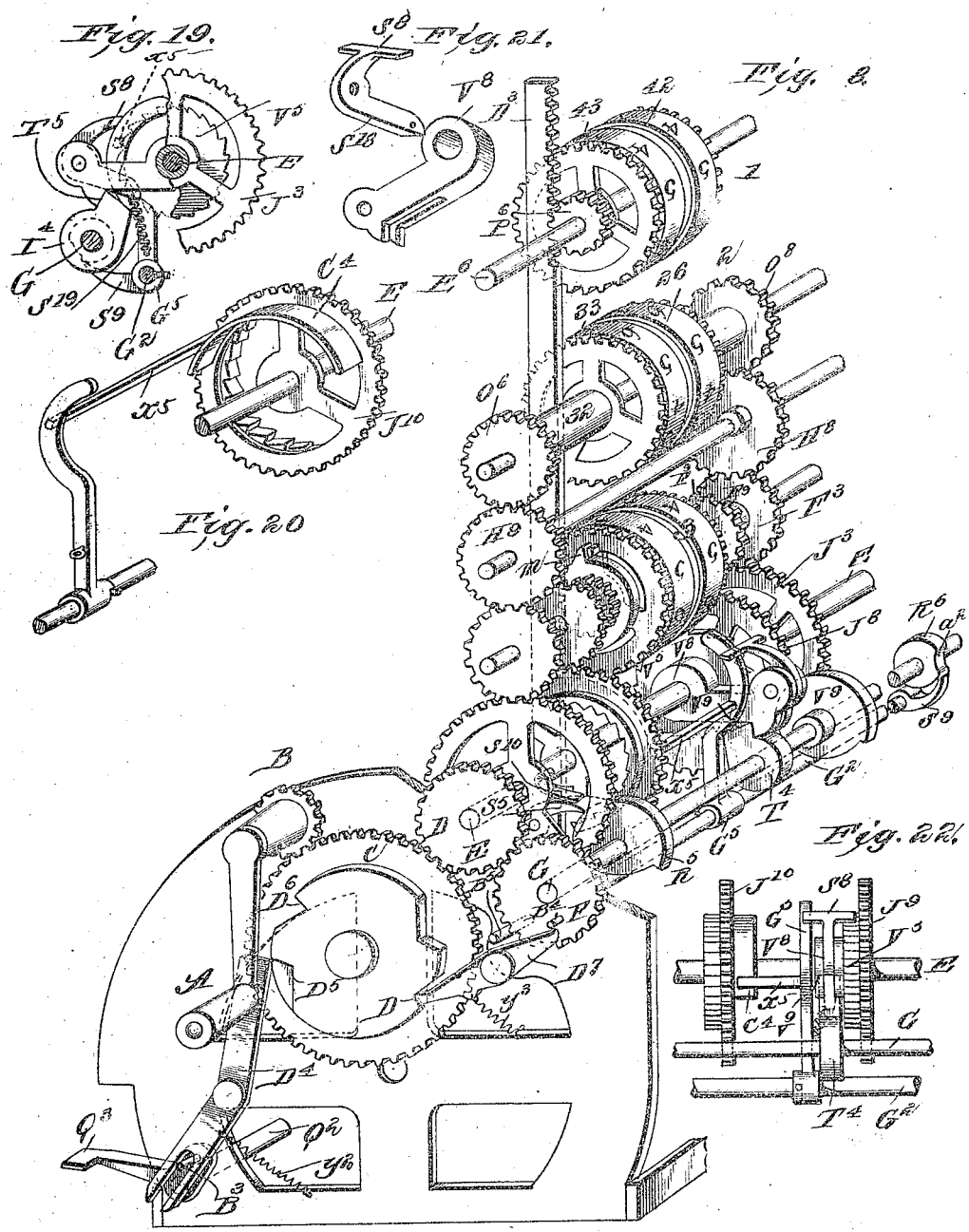
WITNESSES:
INVENTOR
Nathan E. Morris, Jr.
BY Munn & Co.
ATTORNEYS.

No. 876,215.  
N. E. MORRIS, Jr.  
CASH REGISTER AND INDICATOR.  
APPLICATION FILED MAY 13, 1903.
PATENTED JAN. 7, 1908.
8 SHEETS—SHEET 8.
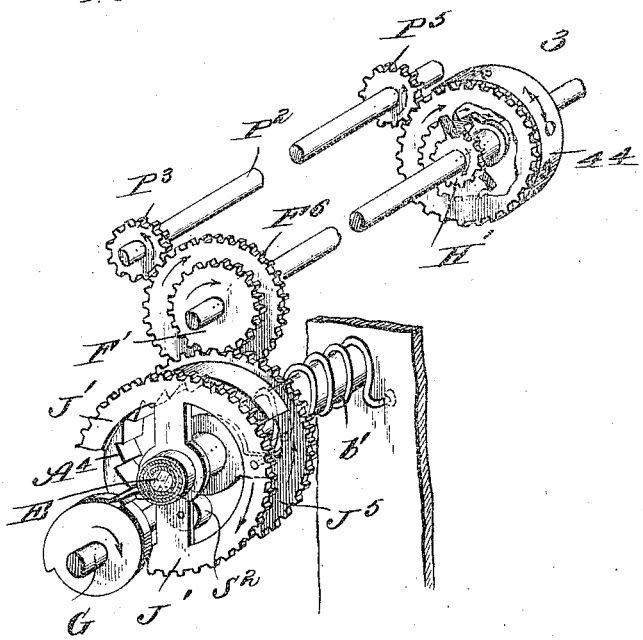
WITNESSES:
INVENTOR  
Nathan E. Morris, Jr.  
BY Munn & Co.  
ATTORNEYS.

UNITED STATES PATENT OFFICE.

NATHAN E. MORRIS, JR., OF MURFREESBORO, TENNESSEE, ASSIGNOR OF ONE-HALF TO WALTER A. ROBERTS, OF FRANKLIN, TENNESSEE.

CASH REGISTER AND INDICATOR.

No. 876,215.  Specification of Letters Patent.  Patented Jan. 7, 1908.

Application filed May 13, 1903. Serial No. 156,929.

*To all whom it may concern:*

Be it known that I, NATHAN E. MORRIS, Jr., a citizen of the United States, and a resident of Murfreesboro, in the county of Rutherford and State of Tennessee, have made certain new and useful Improvements in Cash Registers and Indicators, of which the following is a specification.

My invention is an improvement in cash registers and indicators and has for an object among others to provide means whereby the amount of change will be indicated either alone, as for instance in making change, or together with the amount of the sale, or in other words, a machine which will indicate, preferably both front and back, a minuend, a subtrahend, (the amount of the sale) and a remainder, the amount of the change, the machine doing the subtracting.

In carrying out my invention and as important features thereof I provide a machine having a set of drums indicating the minuend; a set of drums indicating the subtrahend; and a set of drums indicating the remainder together with means whereby the remainder indicating devices may be caused to move in one direction in correspondence with the movement of the minuend indicating devices and means whereby the remainder indicating devices are caused to move in the opposite direction by the movement of the subtrahend indicating devices and I arrange the means for operating the minuend indicating devices so in their joint operation they may move the minuend indicating devices in one direction and then in the other to secure an accurate indication of the remainder.

With the foregoing and other objects in view, my invention consists in certain novel constructions and combinations of parts as will be hereinafter described and claimed.

In the drawings—Figure 1 is a front elevation of the machine. Fig. 2 is a sectional front elevation of the machine, the front of the casing being removed. Fig. 3 is a vertical longitudinal section of the machine on about line 3—3 of Fig. 4. Fig. 4 is a vertical cross section of the machine on about line 4—4 of Figs. 1 and 2. Fig. 5 is a detail vertical cross section on about line 5—5 of Figs. 1 and 2. Fig. 6 is a similar view to Fig. 5 showing a different position of the parts, one of the keys in this figure being depressed. Fig. 7 is a detail perspective view illustrating the subtracting mechanism in connection with the devices for indicating the minuend and the subtrahend. Fig. 8 is a detail perspective view illustrating the carrying devices of the subtracting mechanism and the right hand end of the machine showing the devices for actuating the machine and for releasing any key or keys that may be wrongfully depressed. Fig. 9 is a detail perspective view illustrating the devices by which the subtrahend indicators are moved first in one direction and then in the reverse direction. Fig. 10 is a detail vertical section on about line 10—10 of Fig. 7. Fig. 11 is a detail perspective view of one of the stop device sleeves used in effecting the subtraction. Fig. 12 is a detail perspective view of the other stop device used in the subtracting operation. Fig. 13 is a detail perspective view of the cam for operating the subtrahend drums. Fig. 14 is a detail sectional view of the key bank showing the keys and detent plates such as shown for instance in the patent to Cleal No. 514,670. Fig. 15 is a detail perspective view of a part of one of the detent plates. Fig. 16 is a detail perspective view of the inner end of one of the keys. Fig. 17 is a detail cross section on about line 17—17 of Fig. 18. Fig. 18 is a detail view of the coupling device between one of the segments and the rock shaft such as shown in the Patent No. 580,378. Fig. 19 is a detail side view partly in section of the carrying devices of the subtracting mechanism. Fig. 20 is a detail view of parts of such carrying mechanism. Fig. 21 is a detail perspective view showing the carrying pawl and its arm. Fig. 22 is a detail rear elevation of the carrying devices of the subtracting mechanism. Fig. 23 is a detail perspective view of the upper end of the rack bar for operating the extension indicator frame. Fig. 24 is a detail perspective view of the extension indicator frame. Fig. 25 is a detail perspective view of one of the guides for the rack bars. Fig. 26 is a detail view of one of the pinions for operating the rack bars, and Fig. 27 is a detail view of the cam operating with the pinion shown in Fig. 26.

In carrying out my invention I provide a set of drums 1 for indicating the minuend, a set of drums 2 for indicating the subtrahend and a set of drums 3 for indicating the remainder and in referring to these drums hereafter I may for convenience of reference refer to them respectively as the minuend indicating drums, the subtrahend indicating drums and the remainder indicating drums. In connection with these drums I employ means for operating the minuend indicating drums and the remainder indicating drums in correspondence so that when the minuend indicating drums are turned in one direction to an extent corresponding with the amount of money handed in by a customer in a transaction, the remainder indicating drums will be moved a corresponding distance in one direction, and when the subtrahend indicating drums are moved a distance corresponding to the amount of the purchase,—by means of connecting mechanism presently described, such movement of the subtrahend indicating drums will effect a movement of the remainder indicating drums in a direction the reverse of that to which said remainder indicating drums have been moved by the operation of the minuend indicating drums so that the said remainder indicating drums will be turned first in one direction to an extent corresponding with the amount of money handed in and then in the reverse direction to an extent equal to the amount of sales so that the said remainder indicating drums will thus indicate the amount of change to be given a purchaser in any particular transaction. It will be understood that in securing this indication of the remainder or change I employ carrying devices in connection with each order of the remainder indicating drums to carry tens of units to tens and tens of tens to hundreds, etc. I also provide in my machine a set of clerk indicating drums 4 and which need not be described in detail herein. I also provide at 5 a drum to indicate the character of the transaction as for instance P for "paid out," C for "cash" and R for "received on account," but this is not a part of my invention and need not be described in detail herein.

In order to operate the several devices forming parts of my invention I provide see Fig. 1, a bank of keys 6 for operating the clerk indicating devices 4, a bank of keys 7 for indicating the tens of dollars on the subtrahend indicating devices, a bank of keys 8 for operating upon the unit of dollar drums of the subtrahend indicating devices, a bank of keys 9 for operating the tens of cents drums of the subtrahend indicating devices, a bank of keys 10 for operating the cent drums of the subtrahend indicating devices, a bank of keys 11 for operating the tens and one hundred dollar indicating devices of the minuend indicating devices, a bank of keys 12 for operating the unit of dollar drum of the minuend indicating devices, and banks of keys 13 and 14 for operating respectively the tens and units of cents drums of the minuend indicating devices.

For convenience of manipulation and also for convenience in the construction of the machine I arrange the banks of keys in the order shown in which they range from the left to the right hand of the key-board in the following order, the bank of keys 6 appearing at the left hand end and being followed successively by the banks 7, 8, 11, 12, 9, 13, 14 and 10.

In carrying out my invention I employ in connection with the rock shaft H means whereby when the keys of any particular bank are depressed and the said shaft H is operated, through its connections with the handle A as more fully described hereinafter, the said shaft H will move a rack segment I or $C^5$ as the case may be, to such an extent as to move the intermediate devices corresponding to the particular key depressed through a distance sufficient to secure a corresponding movement of the indicating drum corresponding to the key depressed. The mechanism whereby I secure this result is substantially the same as that shown in the prior patent No. 580,378, to Cleal and Reinhard issued April 13, 1897, and except as hereinafter mentioned this mechanism is not of my invention and need not be described in detail herein. However I find it desirable in carrying out my invention to modify the operating devices so that the operative engagement of the cams for operating the subtrahend indicating devices will be retarded until after the cams which operate the minuend indicating devices are operated to move their segments. Therefore, while as before stated, the devices for connection with the keys and the segments for operating the middle or subtrahend tier are substantially like those of the said Patent No. 580,378, it will be noticed that in the operation of my machine as more fully set forth herein, the indicating devices of the minuend tier are operated in advance of the indicating devices of the subtrahend tier and both such devices are operated from the same shaft so it becomes necessary to retard or defer the operation of the devices for moving the segments I which operate the subtrahend tier until after the segments $C^5$ which operate the minuend tier are operated. To this end by varying the lengths of the cranks Q and S I provide for moving the cams such as A' to a point where their operating shoulders B' are considerably in rear of the intermediate bars or fingers Y in the starting movement of the said cams so that the said cams after terminating their starting movement will have to return through a distance of about 60° before their shoulders B' will engage with the bars Y through which they operate their respective segments such as I, the rack pinion such as $C^5$ having been operated in the meanwhile but in advance of the operation of the corresponding cam pinions such as I all of which will be understood on a comparison of my drawings and the foregoing description with the said patent to Cleal and Reinhard, before referred to.

The operating handle A is loosely mounted on a stub shaft projecting from the side of the frame see Fig. 8 and has upon it a gear B which meshes with a counter gear C upon a second stub shaft projecting from the side of the frame work. The counter gear C meshes with a gear D fixed to the end of the shaft E which gear D meshes with a gear F fast upon the end of a shaft G, the latter being the main shaft of the machine. The shafts E and G extend entirely across the machine to the left side thereof.

The shaft G is provided near its left end with a crank Q see Figs. 3 and 7 which is connected by a pitman R with the crank arm S on the rock shaft H which extends entirely across the machine. The shaft G is given a complete revolution at each operation of the machine by the handle A and the shaft H is thereby oscillated through the crank connections forward and backward a little more than one-third of a revolution in order to secure the operation of the subtrahend indicating devices subsequent to that of the minuend indicating devices.

Loosely mounted upon the shafting at suitable distances are five gear tooth segments I, see Figs. 2 or 7, corresponding respectively to the key banks 6, 7, 8, 9, and 10, which key banks will in practice be lettered in black and the key banks 11, 12, 13 and 14 will be lettered in red or some other distinguishing color.

The four rack pinions or mutilated gears $C^5$, $C^6$, $C^7$, and $C^8$, see Figs. 2 and 4, drive the longitudinally movable rack bars D, D', $D^2$ and $D^3$. These rack bars are guided in their longitudinal movement by suitable guides $C^{20}$ and $C^{21}$ as shown, see Fig. 2, and operate to actuate the upper or minuend set or tier of drums, the keys of the key banks 11, 12, 13 and 14, see Fig. 1, operating respectively in connection with the said rack pinions being in practice lettered in red to aid the eye in locating them as before stated. The gear wheels J, J', $J^2$, $J^3$ and $J^4$ are meshed respectively as before described with the first five segments I and such wheels J to $J^4$ inclusive are fixed respectively to the right hand ends of sleeves $j$, $j'$, $j^2$, $j^3$ and $j^4$, see Fig. 3, telescopically arranged and extending to the left hand side of the machine. These sleeves $j'$ to $j^4$ are carried by the shaft E and support at their left hand ends the type arms $V^4$ constituting parts of a recording mechanism similar to that shown in the Patent No. 580,378, before referred to. The sleeves $j$ to $j^4$ are free to rotate upon the shaft E and upon each other and are thus capable of independent movement. It will be noticed that the gear wheel J, see Figs. 2 and 3 meshes with the gear wheel F', the gear wheel F' meshes with the wheel $H^5$ which in turn meshes with the wheel $O^3$ having the pinion $O^4$ fixed to its right hand side. This pinion $O^4$ meshes with the pinion O on the shaft L' which shaft is provided with the pinion O' which meshes directly with the gear attached to the side of the clerk indicating drum 15 arranged at the center of the middle tier. By this means the clerk indicating drum is operated in the use of the machine. The clerk indicating drums are arranged in pairs, sleeved together, one drum 16 indicating to the front of the machine and the other 15 indicating correspondingly to the back of the machine. The pinion J' meshes with the wheel F', see Fig. 7 which in turn meshes with the wheel $H^6$, the latter meshing with the wheel $O^5$ provided with a pinion $O^6$ fixed to its right hand side. This pinion $O^6$ meshes with a pinion P' on one end of a sleeve P mounted loosely on the shaft L' and provided at its other end with a pinion $B^2$ which meshes with the gear ring connected with the drum for indicating the tens of dollars at the back of the machine. This drum 17 is connected by the sleeve 18 with the drum 19 for indicating tens of dollars at the front of the machine. The gear $J^2$ meshes with the gear $F^3$ which in turn meshes with the gear $H^7$ which meshes with a pinion $O^7$ which is connected by a sleeve 20 to the drum 21 which indicates units of dollars at the back of the machine. This indicator wheel or drum 21 is connected by a sleeve 22 with its corresponding wheel or drum 23 for indicating units of dollars at the front of the machine.

By the described construction it will be noticed I am able to arrange the drums 21, 17, 15, 16, 19 and 23 in a compact form so they may be operated to serve their respective purposes in the operation of the machine.

The gear $J^3$ meshes with the gear $F^4$ which meshes with the gear $H^8$ which meshes with the gear $O^8$ connected by a sleeve 24 with the wheel 25 which indicates tens of cents at the front of the machine. This drum 25 is provided with a gear 26 which meshes with a pinion 27 on a sleeve 28 mounted on a shaft 29 extending transversely across the back of the machine, said sleeve having a pinion 30 which meshes with a gear fixed to the side of the drum 31 for indicating tens of cents at the back of the machine.

The gear $J^4$ meshes with the wheel $F^5$ which in turn meshes with the wheel $H^9$ which meshes with the pinion $O^6$ connected by a sleeve 32 to the wheel 33 indicating units of cents at the front of the machine. For indicating units of cents at the back of the machine I mesh the gear ring connected with the drum 33 with a pinion 34 on the shaft 29 which shaft near its other end is provided with a pinion 35 which meshes with a gear on the side of the drum or wheel 36 which indicates units of cents at the back of the machine. By the described construction it will be noticed that any motion of the segments I meshing with the gears J to J⁴ inclusive will through the intermediate mechanism be registered on the middle tier which indicates the minuend or amount of sale and also the clerk in any particular transaction.

In order to indicate 100 dollars on the minuend tier without the necessity of a separate drum for such purpose, I provide, alongside of the drum indicating tens of dollars, what, for convenience of reference, I term an extension indicating frame C⁸, see Figs. 2, 4 and 7, the same consisting of an arm 37 which is journaled at its middle on one of the sleeves supported on the shaft E⁶, is moved in one direction by a spring 38 which tends to hold said indicator frame normally in neutral position. At the opposite ends of the arm 37 I provide the curved plates 39 corresponding to the segments of a wheel rim and arranged to show, one at the front and the other at the back of the machine and properly inscribed with a $ mark and the number 1 to complete the indication of 100 to 109 dollars and 99 cents in setting up amounts in excess of 99 dollars and 99 cents. Normally the spring 38 see Fig. 7 holds the extension frame C⁸ in such position that these plates 39 will show simply $ marks at both the front and rear of the machine and in order to move this extension frame one step to expose its figure 1 I provide for operating it by the rack bar D, the latter being provided with a pin C⁹ see Fig. 7 arranged to engage the arm C⁸ when said rack bar has been moved to such position as to move the minuend indicator wheel showing tens of dollars through nine-tenths of its revolution so that if the said bar D be moved one step further it will move the indicating frame C⁸ to such an extent as to expose its numeral 1 in connection with the numerals that may be indicated on the indicator drums of the minuend tier. Then when the rack bar returns to its normal position the spring 38 will automatically readjust the extension indicator frame as desired. It will be understood that I am able to operate the extension indicator frame in this manner by providing ten instead of nine keys in the bank 11 of keys see Fig. 1 thus avoiding the necessity of a separate bank of keys and coöperating mechanism for enabling me to set up the one indication in the hundred of dollar line.

The rack pinions C⁵, C⁶, C⁷ and C⁸ supported by and free to rotate on the shaft H mesh with and drive the rack bars D, D', D², and D³, see Fig. 2.

The rack bar D operates to indicate the tens and hundreds of dollars on the upper or minuend tier and also operates to effect a movement of the tens of dollars indicator on the remainder tier corresponding to that of the indicator of the upper tier, see Figs. 2 and 7. The rack bar D' operates to indicate the units of dollars on the upper or minuend tier and also operates to effect a corresponding movement of the units of dollars indicator on the remainder tier. The rack bars D² and D³ likewise operate respectively on the indicator drums for tens and units of cents on the upper or minuend tier and the lower or remainder tier.

The rack bar D drives the pinion H' of the lower tier and the pinion P³ of the upper tier, such pinion being fixed to the side of the indicator wheel 40 which indicates tens of dollars at the front of the upper tier.

The pinion C⁶ see Fig. 2 drives the rack D' which meshes with and drives the pinion H² of the lower tier and also the pinion P⁴ fixed to the left side of wheel 41 indicating units of dollars at the front of the upper tier. The pinion C⁷ drives the rack D² which drives the pinion H³ in the lower tier and the pinion P⁵ fixed to the indicator wheel 42 indicating tens of cents at the front of the upper tier. The pinion C⁸ drives the rack D³ which drives the pinion H⁴ of the lower tier and also the pinion P⁶ see Fig. 21 fixed to the left side of the indicator wheel 43 indicating units of cents at the front of the upper tier. Thus it is evident any motion of the pinions C⁵ to C⁸ will be indicated on both the upper tier and the remainder tier. In securing the indication on the upper or minuend tier the rack bars act alone while in securing the proper indication of the remainder on the lower tier they act in conjunction with the subtrahend indicating devices, the indicating drums or wheels of the remainder series or tier being moved first in one direction to an extent corresponding to the amount handed in by the purchaser to give the minuend on the said drums and then being moved in the reverse direction to an extent equal to the amount of the purchase or the subtrahend in order to secure the subtraction, it being understood that in securing a perfect subtraction it will be necessary in some instances to bring into play the carrying devices from units to tens and from tens to hundreds etc., as will be described hereinafter.

The remainder indicating devices include the wheels or drums 44 to 51 inclusive. The drums 44 and 45 indicate tens of dollars on respectively the front and back of the machine, the drums 46 and 47 indicate respectively units of dollars on the front and back of the machine, the drums 48 and 49 indicate tens of cents respectively on the front and back of the machine and the drums 50 and 51 indicate units of cents on respectively the front and back of the machine. In operating these drums 44 to 51 I provide means whereby they are actuated by a spring see Fig. 3 in one direction so that the rack bars instead of positively operating the drums in one direction operate to effect such movement by moving a stop which holds its respective drum from movement in one direction forward, so the drum can follow its said stop in moving to the point where it indicates the minuend and then the said drum will be operated positively in the opposite direction corresponding to the subtrahend to secure the subtraction as desired.

The shaft E see Fig. 3 has also free to rotate upon it the gear pinions $J^5$, $J^6$, $J^7$, $J^8$, $J^9$, $J^{10}$, and $J^{11}$. The pinion $J^5$ meshes with the pinion $J^6$ which is fixed to the gear $A^8$ which meshes with the pinion $P^3$ on the shaft $L^2$ which shaft is also provided with the pinion $P^4$ meshing with the drum 45 which indicates tens of dollars at the back of the machine. The drum 44 for indicating tens of dollars on the front of the machine is also driven from the shaft $L^2$ by means of a pinion $P^r$ so that the said shaft $L^2$ operates both drums 44 and 45 being in turn driven from the gear $J^5$ which is loose on the shaft E and is actuated in one direction by means of a spring $b'$ fixed at one end to the gear $J^5$ and at its opposite end to the frame of the machine thus giving tension to the said wheel $J^5$ causing it to rotate in one direction. To limit the movement of the drums 44 and 45 by the action of the spring $b'$ through the gearing connections before described I provide in connection with the drum 44 the pinion $H'$ which is provided with a sleeve fitting within the drum 44 and having at one end of said sleeve a disk 52 providing a support for a tooth or spur $c$ see Fig. 10 which is abutted by a lug $a$ on the side of the drum 44 and operates by the engagement of said lug $a$ with the tooth or projection $c$ to stop the movement of the wheel 44 by the action of the spring $b'$ and to permit the said drum to move forward or follow the said tooth $c$ as the same is moved by the meshing of the rack bar D with the pinion $H'$ in the operation of setting up the minuend as before described. By this means it will be seen that as the rack bar D moves the pinion $H'$ forward it also moves or advances the tooth $c$ so that the lug $a$ on the frame 44 can follow up the tooth $c$ to the full extent to which the said tooth is advanced during the operation of setting up the minuend on the minuend indicating devices. At the same time as the lug $a$ abuts the rear side of the tooth $c$ there is nothing to interfere with the reverse movement of the drum 44 in adjusting the same back corresponding to the subtrahend in securing the subtraction from the minuend or amount paid in of the subtrahend or the amount of the purchase, and I preferably secure this reverse movement of the drum 44 by giving a reverse movement to the gear wheel $J^5$ before described. To this end I provide the gear wheel $J^5$ see Figs. 2 and 7 with a series of ratchet teeth $A^4$ which are so disposed as to permit the movement of the wheel $J^5$ in the direction desired by the pawl $S^2$ carried by the gear wheel $J'$ which is in the train of gears by which I set up the tens of dollars on the subtrahend indicating devices as before described, and is therefore given a corresponding movement to the movement of the indicating devices for tens of dollars on the subtrahend indicator.

In order to prevent the movement of the pawl $S^2$ with the movement of the wheel $J^5$ when said wheel advances in the operation of setting the drums 44 forward to correspond with the advance movement of the tooth $c$ effected by the operation of the rack D, I provide means for holding said pawl $S^2$ at certain times out of engagement with the teeth $A^4$ of the wheel $J^5$ and for permitting the said pawl $S^2$ to engage at intervals with the teeth $A^4$ of the wheel $J^5$. As shown a spring $S^{10}$, see Fig. 8, is arranged to press the pawl $S^2$ normally into engagement with the teeth $A^4$ and a cam $R^2$ on the shaft G is arranged to hold the point of the pawl clear of the teeth $A^4$ until the shoulder $r^2$ of the said cam passes beneath the point of the pawl $S^2$ to permit the said pawl to drop into engagement with the teeth $A^4$ when it is desired to move the wheel $J^5$ in correspondence with the movement of the subtrahend indicating devices see Fig. 7. It will be understood that the shaft G makes one complete revolution during each operation of the machine and also that the cam $R^2$ has a fixed relation to the devices for operating the minuend and subtrahend indicating devices so that the said cam $R^2$ will hold the pawl $S^2$ free from engagement with the ratchet teeth $A^4$ while the minuend indicating devices are being operated and will permit the said pawl $S^2$ to engage with its teeth $A^4$ when the subtrahend indicating devices are being operated.

I have now described how the drums for operating tens of dollars in the remainder tier are operated first in one direction correspondingly to the minuend and then in the opposite direction correspondingly to the subtrahend to effect the subtraction. I employ similar devices for operating the drums 46 to 51 inclusive comprising the gears $J^6$, $J^9$ and $J^{10}$, having the ratchet teeth $A^5$, $A^6$ and $A^7$, the gears $J^2$, $J^3$, and $J^4$ provided with the pawls $S^3$, $S^4$, and $S^5$, the cams $R^3$, $R^4$ and $R^5$, and the springs $b^2$, $b^3$, and $b^4$, operating similar to the corresponding parts described in connection with the drums 44 and 45.

In operating the drums 48 and 50 the pinions $H^3$ and $H^4$ and their pins or teeth $m$ and $m$ are on the same side of their respective drums 48 and 50 for convenience of construction. It will also be noticed that the gears $J^6$, $J^8$, and $J^{10}$ mesh directly with their respective drums 47, 48 and 50, instead of through the intermediate mechanism described in connection with the gear $J^5$. Now in the operation of subtracting it will be understood that in order to secure the true remainder it is necessary to carry from the units to the tens in the several series of the remainder indicating devices. I therefore provide for carrying from the unit train of each order of the subtrahend devices to the tens train of the same order in order to secure the true remainder and in doing this I provide a wheel in each unit train of the subtrahend device with a plate or flange such as shown, for instance, in connection with the gear $J^{10}$, such plate or flange $C^4$ being arranged to project from the left hand side of the wheel $J^{10}$ in position to provide a rest for the free end of a lateral arm $X^5$ which projects from the swinging pawl holding arm $G^5$ which is pointed at one end and is formed at its free or swinging end with a curved surface on which rests a lateral extension to one side of the point of the pawl, the other side of the pawl point being arranged to engage a ratchet wheel $V^5$ fixed to the side of the gear $J^9$ when the said pawl is adjusted to position to engage said ratchet wheel by the action of its spring when the pawl holding arm $G^5$ is freed from engagement with the flange or plate $C^4$ on the side of the wheel $J^{10}$, see Fig. 8. It will thus be noticed that I provide a ratchet wheel $V^5$ fixed to the tens wheel, a pawl $S^8$ to engage said ratchet wheel, a swinging arm $V^8$ carrying said pawl, a swinging pawl holding arm $G^5$ by which to hold the pawl free from engagement with its ratchet wheel, a plate $C^4$ on the side of the units wheel for holding the pawl holding arm in position to support the pawl $S^8$, clear of its ratchet wheel and to permit it to drop into engagement with said ratchet wheel, the plate $C^4$ being arranged in such relation to its wheel $J^{10}$ that when the units indicating devices have moved from zero toward 9 one or more spaces, the said plate $C^4$ will permit the arm $G^5$ to drop toward the shaft E thus lowering the pawl $S^8$ into engagement with its ratchet wheel $V^5$ so the said pawl when moved by the devices presently described will advance the ratchet wheel $V^5$ through one space and the train of gears connected therewith and leading to the tens indicating drum of any particular order to secure the desired carrying of the subtracting operation. The pawl $S^8$ is provided with a depending arm $S^{18}$, see Figs. 19, 21, to which is connected one end of a spring $S^{19}$ whose other end is secured to the swinging pawl holding arm $G^5$ near the journal thereof on its shaft $G^2$, thus actuating the pawl into engagement with its ratchet wheel and also operating to exert a downward tension on the pawl carrying arm $V^8$.

To operate the arm $V^8$ see Fig. 8 to move the pawl $S^8$ I provide on the shaft G a cam $T^4$ having an arm $T^5$ arranged to wipe beneath the swinging end of the arm $V^8$ at $V^9$ and so lift the pawl carrying arm $V^8$ at each revolution of the shaft G. It will be understood that this operation of the shaft G will not move the ratchet wheel $V^5$ except at such time when the pawl $S^8$ is permitted by its pawl holding arm $G^5$ to engage with its ratchet wheel $V^5$, the pawl at other times riding upon the curved surface of the arm $G^5$ which is held by the bearing of its lateral pin $X^5$ on the plate $C^4$ of the wheel $J^{10}$.

In order to relieve the friction between the lateral pin $X^5$ and the plate $C^4$ except when it is desired for said parts to coöperate I provide for lifting the arm $G^5$ away from the plate $C^4$ at certain intervals. This is effected by means of an arm $S^9$ on the shaft $G^2$ arranged at its free end to engage the periphery of a cam $R^6$ see Fig. 8 on the shaft G and having a depressed portion $a^2$ in which the free end of the arm $S^9$ rides at such time as it is desired for the lateral arm $X^5$ of the pawl holding arm $G^5$ to rest upon its plate $C^4$. At other times the free end of the arm $S^9$ riding on the outer surface of the cam $R^6$ will be so operated as to tilt the shaft $G^2$ in such manner as to hold the arm $G^5$ with its lateral pin or arm $X^5$ clear of the plate $C^4$ to relieve all friction between said parts. It will also be understood that the cam $R^6$ operates to move the pawl holding arm $G^5$ outward to draw its pin $X^5$ from beneath the plate $C^4$ in the readjustment of the parts in the operation of the machine, it being understood that the outward movement of the arm $G^5$ will free the pawl $S^8$ from engagement with its ratchet wheel $V^5$.

It will be understood that in referring to the wheel in the units train and the wheel in the tens train of any particular series, I do not desire to be limited to the series ranging from 1 to 10, it being understood that I employ the same mechanism for carrying from tens to hundreds, and from hundreds to thousands if necessary to an unlimited extent and I desire in referring to the wheel in the units train and the wheel in the tens train to be understood as meaning from a lower to the next higher order, such for instance as from 1 to 10, 10 to 100, etc.

The adding mechanism *per se* is no part of my invention and need not be described in detail herein. It will be stated however that in practice I may employ an adding mechanism similar to that shown in the Cleal and Reinhard patent No. 580,378, and connect it with the subtrahend tier by gearing with the gears J, J', J², J³ and J⁴ on the shaft E, which said gears operate the subtrahend indicating devices as before described.

It sometimes happens in operation that the wrong key is depressed and it is desirable to correct the error at once by releasing the key so depressed before operating the machine. This is done by means of a shaft Q²—see Figs. 7 and 8—which has fixed pins Z' and so arranged as to act against pins W' etc., on the side of the nine latch plates R' drawing such plates forward when the lever Q³ fixed to the shaft Q² is depressed. It is also desirable that the machine be locked during this correcting movement to prevent the motion of the indicating mechanism. This is accomplished by means of a lever arm D⁴ mounted upon a stub shaft projecting from the side of the frame-work and so geared that when the lever Q³ is depressed the pin B³ operates in the slot at the lower end of the arm D⁴, causing the upper end of the lever arm D⁴ to pass under a shoulder D⁵ in a plate on the side of the gear C. When lever Q³ is released, the spring Y² draws it to normal position. It is also desirable when the crank A has been turned through two revolutions its motion be stopped, this being the feature of one of the operating arms of the machine. This is accomplished by means of the lever D⁷ mounted upon a stub shaft projecting from the frame-work and so arranged that just before the gear F on the shaft G completes its revolution the pin B⁴ projecting from its side will act on the lever D⁷ causing it to engage the shoulder D⁶ in the plate on the side of the gear C, thus locking the machine. On beginning the next operation of the machine, it is necessary to push the crank A slightly back, releasing the lever D⁷ from the inclined shoulder D⁶ when the lever D⁷ will be drawn by the spring Y³ to rest against a pin B⁵ projecting from the frame-work where it will remain until it is again caused to move by the pin B⁴ on the side of the gear F.

In the use of my invention the machine operates as follows. Suppose clerk A to sell goods amounting to $78.56 and receive $100.00 by cash or check in payment. He will press firmly key 100 in the key bank 11, also keys A, $70.00, $8.00, $.50 and $.06, respectively, in their respective banks, 6, 7, 8, 9 and 10. He will now take hold of the crank A and press it slightly back and then turn it forward through two revolutions, causing $100.00 to appear on the upper tier, $78.56 to appear on the middle tier, and $21.44 to appear on the lower tier, both at the front and back. Thus, we have indicated a problem in subtraction, the upper tier indicating the minuend or the amount of money paid in, the middle tier indicating the subtrahend or the amount of sale, and the lower tier indicating the remainder, or the change to be given the customer. This result is brought about as follows. When above named keys are depressed and the crank is turned through about ¾ of a revolution, the indicator wheels will all show zero in the three tiers. During the next ⅜ of a revolution, the shoulder B² which has engaged the latch plate Y—see Fig. 7—has caused the rack pinion D to move until stopped by the depressed key $100.00. Now since the pinion C⁵ drives the rack D which drives the pinion P³ fixed to the drum indicating tens of dollars, at the front of the upper or minuend tier, this wheel 40 must make one complete revolution revealing zero, but the rack D has near its upper end a pin C⁹ projecting toward the left and this pin is so located that when the rack bar D has moved downwardly sufficiently to reveal 9 to view at the front of the machine, the pin C⁹ is just in contact with the upper side of the arm of the extension indicator frame C⁸, and when the rack bar is moved to expose zero on the tens wheel 40, the extension frame will be moved to expose the figure 1 and the dollar mark on the curved plates of said extension frame, causing the upper tier to indicate $100.00 at the front and back of the machine. The pinion H, however, is also driven by the rack D, see Figs. 2 and 7, and therefore moves forward, but the spring b' will force the pinion J⁵ to revolve, which forces the pinion F⁵ which in turn drives the pinion A⁸, which drives the pinion P³ driving the pinions P⁴ and P⁵, operating the indicator wheels, keeping the lugs a of said wheels pressed tightly against the teeth c, thus causing the indicator wheels in the lower tier to indicate zero. During this time the shaft G has been caused to rotate and just at this period the shoulders such as r² on the plates R² see Figs. 7 and 8 will pass under the free ends of pawls such as S², allowing said pawls to lower and engage their respective ratchet wheels fixed to the sides of the pinions for driving the pinions in the train of gears for operating the remainder indicator drums as before described. Just at this point in the operation, shoulders B' will engage with and cause the segments I corresponding to keys A, $70.00, $8.00, $.50 and $.06 to begin to revolve, driving the gears for actuating the subtrahend indicating drums and the clerk indicating drums, and which by means of suitable intermediate gears will cause the indicator wheels on the middle tier to reveal $78.56 and those on the lower tier to revolve in the direction of nine from zero and indicate in this case $32.54. This, however, is not the true remainder, but just at this period the carrying devices before described begin to act as follows.

The cam R⁶ see Fig. 8 has in operation revolved so that the free end of the arm S⁹ is now moving in the depression a², allowing the shaft $G^2$ to rotate slightly forward, permitting the arm $G^5$ to fall forward until its arm $x^5$ presses against the flange $C^4$. Now this flange has passed from under the arm $x^5$ which it always does when its corresponding indicator wheel passes from zero toward 9, otherwise there would be no need of carrying, and the pawl $S^8$ will engage the ratchet wheel $V^5$ causing the gear to which it is attached to move sufficiently to cause its indicator wheel of the lower tier to move through one space as the cam $T^4$ raises the free end of the pawl carrying plate $V^8$. The lower or remainder tier will now indicate $21.44, the true remainder. In a similar manner change may be indicated for any amount not exceeding $109.99. Manifestly, change transactions, cash transactions, charge transactions, and other similar transactions may be indicated upon the machine, some of them requiring and others not requiring the operation of the subtrahend indicating mechanism.

Having thus described my invention what I claim as new and desire to secure by Letters Patent is—

1. An indicating and registering machine comprising a set of drums indicating the value of the minuend, a set of drums indicating the value of the subtrahend, and two sets of key banks, one corresponding to the drums indicating the minuend, the other to the drums indicating the subtrahend.

2. An indicating and registering machine, comprising a minuend indicator, a subtrahend indicator, two sets of key banks, one or both sets having ten keys, and the intermediate mechanism between these keys and indicators, substantially as and for the purposes set forth.

3. The combination of remainder indicating drums, a wheel in units train, and a wheel in tens train, a ratchet wheel $V^5$ in connection with tens wheels, a pawl $S^8$ to engage said ratchet wheel, a carrying arm $V^8$ for said pawl, a swinging pawl holding arm $G^5$ by which to hold the pawl $S^8$ out of engagement with the ratchet wheel $V^5$, a plate $C^4$ on the units wheel for holding the pawl holding arm in position to support the pawl clear of its ratchet wheel and to permit it to adjust into engagement with said ratchet wheel, and means whereby the pawl may be advanced step by step as and for the purpose set forth.

4. In a machine of the character described, the combination of a set of drums indicating the value of the change, a wheel in units train of any order with a wheel in train of next higher order, a ratchet wheel in connection with this higher order, a pawl to engage said ratchet wheel, and means operated from the wheel in train of preceding lower order by which to hold said pawl clear of engagement with its ratchet wheel and to permit it to adjust into such engagement, and means for advancing said pawl by which it will be caused to operate its ratchet wheel as and for the purposes set forth.

5. In a machine of the character described, the combination with a wheel in tens train and a wheel in units train, of a ratchet wheel $V^5$ in connection with tens wheel, a pawl $S^8$ to engage said ratchet wheel, a carrying arm $V^8$ for said pawl, a pawl holding arm $G^5$ having a lateral pin $X^5$, and a plate $C^4$ on the units wheel for engagement with said pin $X^5$ to hold the arm $G^5$ in its outermost position for the purpose set forth.

6. In a machine of the character described, the combination with a set of drums indicating the value of the change, a wheel in tens train and a wheel in units train, of a pawl for advancing the tens wheel, a pawl holding arm for holding said pawl out of engagement with its wheel, means on the units wheel for holding the pawl holding arm in position to support its pawl clear of engagement with its wheel, a rock shaft $G^2$ carrying the pawl holding arm, an arm $S^9$ on said rock shaft and a cam $R^6$ with which said arm contacts, said cam having a depressed portion $A^2$ to receive the arm to permit the pawl holding arm to drop forward allowing the pawl to engage its ratchet wheel, for the purposes set forth.

7. In a machine of the character described, the combination of a set of drums indicating the value of the change, a wheel in train of any higher order, a wheel in train of corresponding lower order, carrying means between the wheel of lower and that of next higher order, including a pawl for advancing the wheel of higher order, a pawl holding arm for holding said pawl out of engagement with its wheel and means on wheel in train of next lower order for supporting the pawl holding arm in position to hold the pawl clear of its wheel, and means for holding the lateral pin, as $X^5$, out of engagement with the devices, as $C^4$, on wheels of lower order, at intervals, for the purposes set forth.

8. In a machine of the character described, the combination with a set of drums indicating the value of change a wheel in train of any higher order, a wheel in train of next lower order, of a pawl for advancing the wheel of higher order, a carrier for said pawl, a means operating in connection with wheel of lower order for controlling the engagement of the pawl with wheel of higher order, and a shaft $G^2$ provided with a cam, as $T^4$, engaging with the pawl carrying arm, as $V^8$, for advancing said pawl, as and for the purposes set forth.

9. In a machine of the character described, the combination of a set of drums indicating the value of the change, a wheel in train of any higher order, a wheel in train corresponding lower order, a plate, as $C^4$, on wheel in train of lower order, a ratchet wheel on wheel in train of higher order, a pawl for engaging said ratchet wheel, a carrier for said pawl, a rotating cam, as $T^4$, engaging said carrier to advance the pawl, a pawl holding arm $G^5$ having a lateral pin, as $X^5$, operating on the plate or flange, as $C^4$, on wheel in train of lower order, a rock shaft $G^2$ carrying said pawl holding arm, an arm $S^9$ on said rock shaft, and a cam $R^6$ engaged by said arm and having a depressed portion $A^2$ to receive the point thereof to permit the adjustment of the pin, as $X^5$, into engagement with plate, as $C^4$, as and for the purposes set forth.

10. The combination with a longitudinally movable bar, and an indicator wheel or drum arranged for operation by said bar, of a rocking indicator frame inscribed to correspond with the next highest order, and means whereby said bar may operate the indicator frame in one direction.

11. The combination of a rack bar, mechanism for operating the rack bar including a bank having ten keys, an indicator wheel or drum arranged for operation by said rack bar, and a rocking indicator frame to indicate the order next higher in succession to that of the indicator wheel and arranged for operation by the rack bar when the latter is moved as the result of the depression of the tenth key of its bank, substantially as set forth.

12. The combination of a bank of ten keys and indicator mechanism including a wheel and an indicator frame indicating the next higher order to that of the wheel, and intermediate mechanism whereby the indicator wheel may be operated by the manipulation of any one of the ten keys of the bank and the extension frame may be operated jointly with the indicator wheel by the manipulation of the tenth key of the bank.

13. The combination with an indicator wheel, a rocking indicator frame operating alongside said wheel, a rack bar geared with said wheel to operate the same, and a projection on the said rack bar to engage and operate the extension frame, substantially as set forth.

14. In a machine substantially as described the combination with the remainder indicating drum of means for permitting the movement of such drum in one direction, a spring for moving the drum in such direction, and means for moving the drum in the reverse direction whereby the drum may be moved in its first movement a distance corresponding to the minuend and may be moved in the reverse direction a distance corresponding to the subtrahend to effect a subtraction.

15. The combination of the remainder indicating drum, a wheel provided with ratchet teeth, gearing between said wheel and the drum, a spring operating upon the said wheel whereby to give the drum tension in one direction, means for limiting the movement of the wheel by its spring in such direction, a pawl arranged for engagement with the ratchet teeth of the wheel, and a gear for said pawl.

16. The combination with the remainder indicating drum, of a wheel for operating same in both directions, a spring operating said wheel in one direction, means for limiting the movement of the wheel in such direction by its spring, and means operating upon the wheel to move the remainder indicating drum in the reverse direction.

17. The combination of the remainder indicating drum, a wheel for operating said drum, a spring for moving said wheel in one direction, ratchet teeth connected with the wheel and a pawl engaging said ratchet teeth and operating to move the wheel in the opposite direction from its spring, and means whereby said pawl is held clear of its ratchet teeth when the wheel is being moved by its spring, and is permitted to engage with said ratchet teeth during the opposite movement of the wheel.

18. The combination with the minuend and subtrahend indicating devices, means for operating the same, the remainder indicating drum, a spring for moving said drum in one direction, means whereby the devices for operating the minuend indicator may limit such movement of the remainder indicating drum, and means whereby the devices for operating the subtrahend indicator may move the remainder indicating drum in a direction the reverse of that to which it is moved by the spring movement of its operating wheel.

19. The combination with the minuend indicating drums, of the remainder indicating drums, the rack bars geared with the minuend indicating drums, pinions geared with the rack bars and provided adjacent to the remainder indicating drums with projecting teeth, lugs or projections on the remainder indicating drums for engagement with said teeth, springs for operating the remainder indicating drums to cause their lugs to abut the said teeth whereby as the teeth are advanced by the movement of the rack bars the remainder indicating drums may be advanced with such movement and the subtrahend indicating devices and their operating means arranged to give a reverse movement to the remainder indicating drums.

20. In a subtracting mechanism the combination with the wheel in the unit train and wheel in the tens train, of a ratchet wheel in connection with the tens wheel, a pawl to engage said ratchet wheel, a swinging arm carried by said pawl, a swinging pawl holding arm by which to hold the pawl out of engagement with its ratchet wheel, a plate on the units wheel for holding the pawl holding arm in position to support the pawl clear of its ratchet wheel and to permit it to adjust into engagement with said ratchet wheel, and means whereby the pawl may be advanced step by step.

21. The combination in a subtracting mechanism with a wheel in the units train and a wheel in the tens train, of intermediate devices whereby the movement of the unit wheel in passing from zero toward 9 may operate to advance the tens wheel correspondingly, such intermediate devices including a ratchet wheel on the tens wheel, a pawl to engage said ratchet wheel, and means on the units wheel for holding the pawl clear of such ratchet wheel.

22. The combination in a subtracting mechanism of a wheel in the tens train, a wheel in the units train, a ratchet wheel in connection with the tens wheel, a pawl to engage said ratchet wheel, and means operated from the units wheel by which to hold said pawl clear of engagement with its ratchet wheel and to permit it to adjust into such engagement, and means for advancing said pawl by which it will be caused to operate its ratchet wheel.

23. The combination in a subtracting mechanism, with a wheel in the tens train, and a wheel in the units train, of a pawl for advancing the tens wheel, a carrier for said pawl, means for operating the carrier to advance the pawl, a swinging arm for holding the pawl out of operative engagement with the tens wheel, and means in connection with the unit wheel for adjusting said pawl holding arm into and out of position to hold the pawl clear of engagement with its wheel.

24. The combination in a subtracting mechanism with a wheel in the tens train and a wheel in the units train, of a ratchet wheel $V^5$ in connection with the tens wheel, a pawl $S^8$ to engage said ratchet wheel, a carrying arm $V^8$ for said pawl, a pawl holding arm $G^5$ having a lateral pin $X^5$, and a plate $C^4$ on the units wheel for engagement with said pin $X^5$ to hold the arm $G^5$ in its outermost position.

25. In a subtracting mechanism the combination with a wheel in the tens train, and a wheel in the units train, of a pawl for advancing the tens wheel, a pawl holding arm for holding said pawl out of engagement with its wheel, means on the units wheel for holding the pawl holding arm in position to support its pawl clear of engagement with its wheel, a rock shaft, carrying the pawl holding arm, an arm on said rock shaft, and a cam with which said arm contacts, said cam having a depressed portion to receive the arm to permit the pawl holding arm to adjust into engagement with its operating devices on the units wheel.

26. The combination in a subtracting mechanism of the wheel in the tens train, the wheel in the units train, carrying means between the units wheel and the tens wheel, including a pawl for advancing the tens wheel, a pawl holding arm for holding the said pawl out of engagement with its wheel, and means on the units wheel for supporting the pawl holding arm in position to secure the pawl clear of its wheel, and means for holding the pawl holding arm out of engagement with the devices on the units wheel at intervals.

27. In a subtracting mechanism the combination with a wheel in the units train and a wheel in the tens train, of a pawl for advancing the tens wheel, a carrier for said pawl, means operating in connection with the units wheel for controlling the engagement of the pawl with the tens wheel, and a shaft provided with a cam engaging with the pawl carrying arm for advancing said pawl.

28. The combination in a subtracting mechanism of a wheel in the tens train, a wheel in the units train, a ratchet wheel in connection with the tens wheel, a pawl for engaging said ratchet wheel, a carrier for said pawl, a shaft provided with a cam engaging said carrier to advance the pawl, a pawl holding device for securing the pawl clear of its ratchet wheel, and means operating in connection with the units wheel for adjusting said pawl holding device to position to hold the pawl clear of its ratchet wheel.

29. The combination in a subtracting mechanism of a wheel in the tens train, a wheel in the units train, a ratchet wheel on the tens wheel, a plate $C^4$ on the units wheel, a pawl for engaging the ratchet wheel, a carrier for said pawl, a rotating cam engaging said carrier to advance the pawl, a pawl holding arm having a lateral pin operating on the plate or flange $C^4$ of the units wheel, a rock shaft carrying said pawl holding arm, an arm on said rock shaft, and a cam engaged by said arm and having a depressed portion to receive the point thereof to permit the adjustment of the pawl holding arm into engagement with the plate $C^4$.

NATHAN E. MORRIS, Jr.

Witnesses:
SOLON C. KEMON,
PERRY B. TURPIN.